United States Patent [19]
Van Huisen

[11] 3,741,480

[45] June 26, 1973

[54] SMOG AND WEATHER CONTROL SYSTEM

[76] Inventor: Allen T. Van Huisen, 2267 Clover Drive N.W., Grand Rapids, Mich. 49504

[22] Filed: July 2, 1970

[21] Appl. No.: 51,835

[52] U.S. Cl. .................................. 239/2 R, 165/45
[51] Int. Cl. ............................................ A01g 15/00
[58] Field of Search .......................... 165/45; 159/1; 203/10, 100; 60/26; 239/2 R, 14

[56] References Cited
UNITED STATES PATENTS

| | | | |
|---|---|---|---|
| 3,568,925 | 8/1968 | Lietzer | 239/2 R |
| 3,363,664 | 1/1968 | Villanueva | 159/1 X |
| 3,470,943 | 10/1969 | Van Huisen | 165/45 |
| 3,135,466 | 6/1964 | Reid | 203/10 X |
| 3,274,769 | 9/1966 | Reynolds | 165/45 X |
| 3,140,986 | 7/1964 | Hubbard | 159/1 X |

Primary Examiner—Carroll B. Dority, Jr.
Attorney—Marvin E. Jacobs

[57] ABSTRACT

An air cleansing system for cities and other geographically located areas in which geothermal wells supply heat to a top surface of a body of water upwind from the geographical area, creating a moist high pressure area over the water. The high pressure area, moved by the wind will precipitate the smog particles from the air.

7 Claims, 3 Drawing Figures

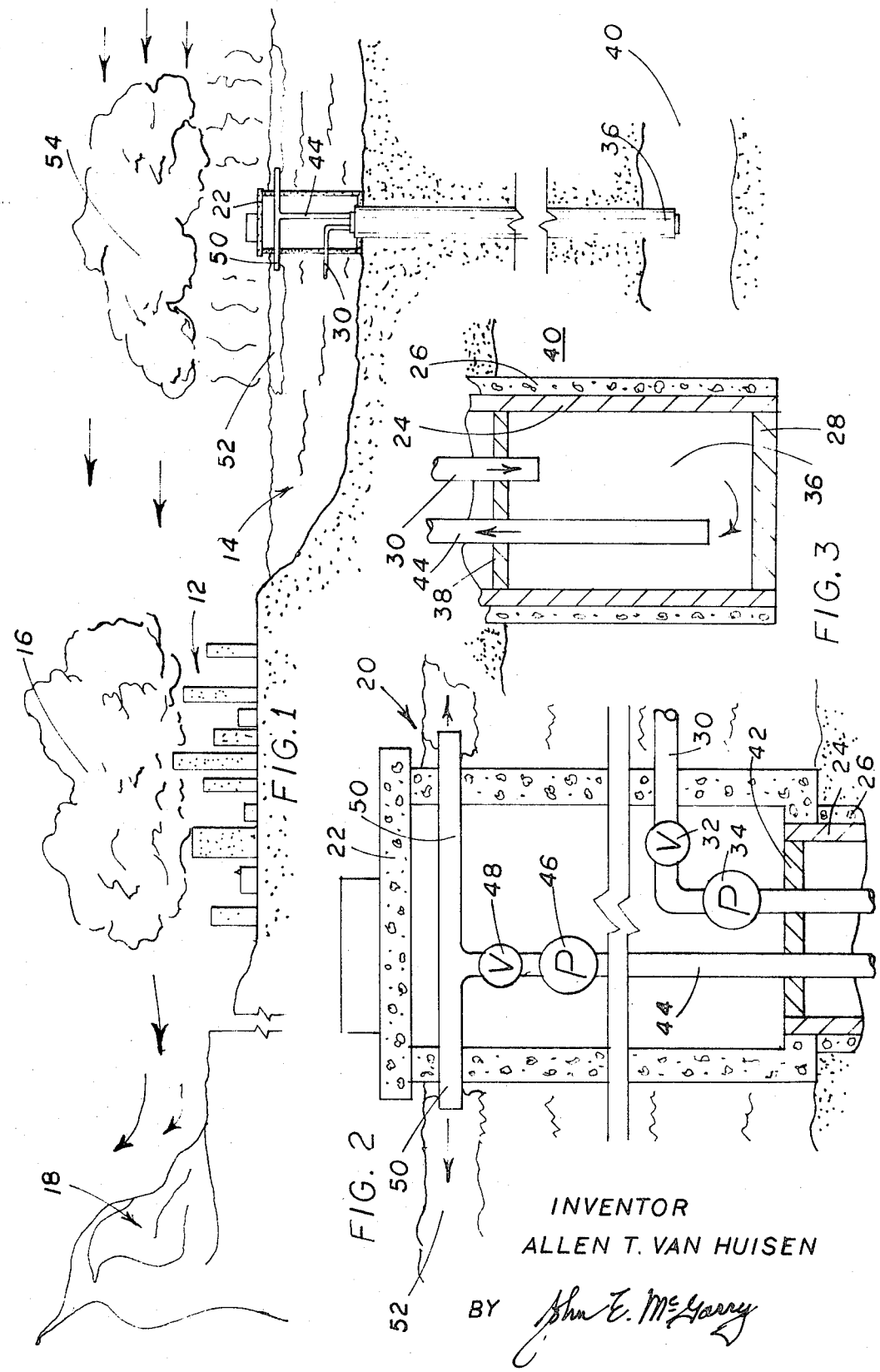

SMOG AND WEATHER CONTROL SYSTEM

This invention relates to an air cleaning system. In one of its apspects, it relates to a system for cleaning air in which goethermal wells heat a body of water upwind from a city or other geographical location. In another of its aspects, the invention relates to a method of cleansing air in which method a body of water is heated to produce a moist high pressure area which causes the air movement and precipitation of heavy smog particles.

Many of our cities are plagued with increasing air pollution. The normal pollution is dangerous to health and causes substantial property damage. In addition, temperature inversions prevent movement of smog laden air from the cities causing an increased build up of smog during certain periods of time. A temperature inversion is a layer of cooler air which is held in a given area by a higher layer of warmer air.

By various aspect of this invention, one or more of the following, or other, objects can be obtained.

It is an object of this invention to provide a system and method for cleaning smog laden air.

It is another object of this invention to provide a system and method for eliminating smog build up in cities during periods of temperature inversion.

It is another object of this invention to provide a system and method for control of air currents so that contaminants in the air can be diverted from populous areas.

Other aspects, objects, and the several advantages of this invention are apparent to one skilled in the art from a study of this disclosure, the drawings, and the appended claims.

According to the invention there is provided a smog cleansing system and method for cities and the like located in a given geographical area. A body of water is located upwind from the geographical area and a goethermal well extends from the surface of the earth into a geothermal zone having elevated temperatures. Means are provided for transferring the heat from the geothermal zone to a top surface of the body of water to heat the top surface of the water thereby causing an area of moist high pressure air over the body of water. The prevailing winds can then carry the moist high pressure area into the given geographical area, mixing the moist air with the smog laden air. Further movement of the moist air will carry the smog laden air away from the city and cause precipitation of the smog particles from the air.

The invention will now be described with reference to the accompanying drawings, in which:

FIG. 1 is a schematic representation of a system according to the invention;

FIG. 2 is an enlarged view of a portion of FIG. 1 illustrating the top of the geothermic well; and FIG. 3 is an enlarged partial view of the bottom of the geothermal well illustrating a means by which heat can be extracted from the geothermal zone by the geothermal well.

Referring now to the drawings, there is shown a geographical area such as a city, generally designated by 12, being adjacent to a body of water 14 which is upwind from the geographical area 12. As used throughout this specification, "upwind" means the opposite direction from the flow of the prevailing winds. A smog layer 16 is indicated over the city 12 and mountains 18 are on the opposite side of the city 12 from the body of water 14.

A geothermal well generally indicated as 20 has a platform 22 of conventional nature. The geothermal well comprises a metal casing 24 surrounded by a concrete layer 26 in engagement therewith. A plug 28 is provided at the bottom of the metal casing 24 and a cap 42 is provided at the top of the metal casing 24. An inlet pipe 30 has a valve 32 and a pump 34 communicating at its upper end with a lower portion of the body of water 14 and communicating at its lower end with a heat exchanger 36 in a bottom portion of the geothermal well 20. The heat exchanger 36 has a sealing plate 38 to provide a closed area of the geothermal well with the plug 28. The bottom of the geothermal well extends into a geothermal zone 40 having temperatures preferably in the range of 500° to 1,000° F.

A fluid withdrawal pipe 44 extends from the bottom of the heat exchanger 36 upwardly through the metal casing 24 ending in laterally extending branch pipes 50. The fluid withdrawal pipe 44 has a pump 46 and a valve 48.

In operation, when a temperature inversion occurs over a city 12, the geothermal well pumps water from the body of water 14 through the inlet pipe 30 downwardly into the heat exchanger 36 wherein the water is heated. In actual practice, there will be a plurality of such wells spaced across the direction of movement of the prevailing winds. The heated water is withdrawn through the withdrawal pipe 44 and pumped by the pump 46 through valve 48 and out through the horizontal branch pipes 50 at the top surface of the body of water 14. This discharge of heated water from the well forms a heated layer of water 52 on the top of the body of water 14. The heated layer of water over a wide surface area causes an increase in the rate of evaporation of the water from the body 14, and thereby produces a moist high pressure area designated as 54 above the body of water. This heated mass of air will rise, thereby causing a cooler mass of air to move in behind the moist air. The flow of the cooler air will push the moist air in the direction of the prevailing winds into the city. The movement of the moist air into this area will cause cleansing of the air. In the case of a temperature inversion, the moist air pushes the cooler air over the water upwardly, thereby permitting the prevailing winds to force the moist high pressure area 54 towards the city 12. When the high pressure area 54 reaches the city 12, it will mingle with the smog layer 16 and cause the smog particles therein to become heavier. The prevailing winds will then push the smog layer away from the city in the direction of movement of the prevailing winds. When the smog layer 16 reaches the mountains 18, it will rise, thereby causing precipitation of the smog particles along with the moisture in this layer. In this manner, the air will be cleansed of smog particles.

Whereas the invention has been described with reference to a preferred system for bringing heat from the earth up to a top layer of water, it is within the scope of the invention to provide other forms of heat exchanges and other means of transferring heat from the geothermal zone to the surface of the earth. Other such systems are disclosed un my U.S. Pat. No. 3,470,943 and in my copending U.S. Pat. application, Ser. No. 868,395, filed Oct. 22, 1969, now U.S. Pat. No. 3,635,383 and entitled "GEOTHERMAL IN SITU MINING AND RETORTING SYSTEM."

The body of water 14 can be naturally occuring or it can be provided for use of the system.

The invention can be used to cleanse air during times of temperature inversion and at other times when the natural processes are insufficient to cleanse the air of smog.

The invention can be used to divert polluted air currents. For example, the geothermal wells can be used to heat portions of the ground surface of shallow bodies of water in area spaced laterally with repsect to the prevailing winds. In such areas the heated ground surfaces will cause air movement in the direction of the heated ground. If pollution containing gasses or radioactive gasses, for example, were contained in a cloud and moving toward a city, the heat from selected areas adjacent the ground surface would cause divergence of the prevailing wind toward the heated ground and thus would avaid the city. The pollution particles would then be dumped onto less populated areas.

Reasonable variation and modification are possible within the scope of the foregoing disclosure, the drawings, and the appended claims without departing from the spirit of the invention.

The embodiments of the invention in which an exclusive property or privilege is claimed are defined as follows:

1. A system for movement of smog laden air from over a populated geographical area having a cooler, temperature inversion layer disposed over the smog laden air, said system comprising:
    an open basin containing a body of water located within the line of flow of prevailing winds toward said area, said basin having an upper surface exposed to the air and a lower surface adjacent the ground;
    at least one geothermal well located within and below said basin including a casing having an upper portion extending through said body of water, a lower portion extending downwardly into a sub-surface, geothermal zone having a temperature of at least 500°F, a plug inserted into the bottom end of the casing and a cap closing the upper portion of the casing;
    a closed heat exchanger forming the lower portion of the casing, being disposed within said zone and having an inlet and an outlet;
    a water inlet penetrating the upper portion of said casing within said body of water having one end communicating with said body of water in the vicinity of the lower surface of the basin and a second end connected to the inlet to the heat exchanger;
    a heated water outlet penetrating said casing within said upper portion having a discharge end connected to said body of water in the vicinity of the upper surface of the basin and a second end connected to the outlet to said heat exchanger;
    pump means connected to said water inlet and to said heated water outlet for delivering cooler water from the bottom of the basin to the heat exchanger and for discharing a sufficient amount of heated water on the top of the basin to form a body of moist, warm, high pressure air over said body of water which rises into said prevailing wind and said body of moist air when moved by the prevailing winds will mix with said smog laden air and will cause rise of said cooler inversion layer over said geographical area and will result in movement of said smog-moist air mixture with said wind away from said area.

2. A system according to claim 1 wherein geothermal well includes a concrete layer surrounding the exterior of the casing and in engagement therewith.

3. A system according to claim 1 wherein said pumping means includes valve means for controlling the flow of inlet water and outlet discharge heated water.

4. A method of moving smog laden air from over a populated geographical area having a cooler, temperature inversion layer disposed over the smog laden air:
    inserting at least one well casing through an open body of water located within the line of flow of prevailing winds toward said area, said casing extending into a geothermal zone having a temperature of at least 500°F;
    forming a heat exchanger having a closed end within the portion of the casing disposed within said zone;
    pumping cooler feed water from near the bottom of the body of water into the heat exchanger and forming heated water therein;
    pumping heated water from the heat exchanger and discharging a sufficient amount of the heated water near the surface of the body of water to form a body of moist, warm air over the body of water which rises into said prevailing winds, is carried by said winds to said area, mixes with said smog laden air, causes said inversion layer to rise and results in movement of said smog-moist air mixture with said winds away from said area.

5. A method according to claim 4 in which the geothermal zone has a temeprature from 500°F to 1,000°F.

6. A method according to claim 5 in which the well casing is formed of metal and is surrounded by a concrete layer.

7. A method according to claim 6 further including the step of controlling the flow of said cooler feed water and said heated discharge water.

* * * * *